United States Patent [19]

Bernhard

[11] Patent Number: 4,457,784
[45] Date of Patent: Jul. 3, 1984

[54] GREEN NACREOUS PIGMENTS HAVING CALCINED CR OXIDE AND PHOSPHATE LAYER, THEIR PREPARATION, AND USE

[75] Inventor: Horst Bernhard, Schwarzenberg, Austria

[73] Assignee: Merck Patent Gesellschaft mit beschränkter Haftung, Darmstadt, Fed. Rep. of Germany

[21] Appl. No.: 421,684

[22] Filed: Sep. 22, 1982

[30] Foreign Application Priority Data

Sep. 23, 1981 [DE] Fed. Rep. of Germany ....... 3137809

[51] Int. Cl.$^3$ ............................................. C09C 1/00
[52] U.S. Cl. .................................. 106/291; 106/302; 106/308 B; 424/63
[58] Field of Search .................... 106/291, 300, 308 B, 106/302

[56] References Cited

U.S. PATENT DOCUMENTS

| | | | |
|---|---|---|---|
| 3,087,828 | 4/1963 | Linton | 106/291 |
| 3,087,829 | 4/1963 | Linton | 106/291 |
| 3,127,280 | 3/1964 | Whatley | 106/308 B |
| 3,342,617 | 9/1967 | Jackson | 106/291 |
| 3,650,790 | 3/1972 | Klenke et al. | 106/291 |
| 3,832,208 | 7/1974 | Jackson | 106/308 Q |
| 3,926,659 | 12/1975 | Bernhard et al. | 106/291 |
| 4,134,776 | 1/1979 | Rieger et al. | 106/291 |
| 4,192,691 | 3/1980 | Armanini | 106/291 |

FOREIGN PATENT DOCUMENTS 1279672  6/1972  United Kingdom ................ 106/300

*Primary Examiner*—Helen M. McCarthy
*Attorney, Agent, or Firm*—Millen & White

[57] ABSTRACT

Nacreous pigments comprise a mica platelet coated with a first layer of a metal oxide and a second layer of chromium(III) oxide, wherein the chromium oxide layer further contains at least 0.05 mol % of phosphate ion based on the number of moles of chromium ion therein. Because of the phosphate ion, the chromium layer is continuous and essentially crack-free even at larger thicknesses, and contributes to the interference effect. The pigments are particularly useful as lustrous agents in cosmetics.

9 Claims, No Drawings

GREEN NACREOUS PIGMENTS HAVING CALCINED CR OXIDE AND PHOSPHATE LAYER, THEIR PREPARATION, AND USE

The present invention relates to nacreous pigments having a green powder color (e.g. generally wavelengths of 490–530 nm) and which, on the platelet surface, carry a top layer of chromium(III) oxide.

Pigments of this type are in themselves known, for example from German Pat. No. 1,467,468. To prepare such pigments, mica platelets which are coated with metal oxides are provided with a top layer of chromium(III) hydroxide which, on drying and calcining of the pigments, is converted into a chromium(III) oxide layer.

To obtain a pigment having optimal nacreous properties, it is necessary that the primary particles forming the coating should have a size below about 100 nm. For larger particles incident light is scattered and the interference effects responsible for the pearlescent luster are impaired.

However, while the coating step with chromium hydroxide can be carried out in such a way that even relatively thick hydroxide layers can be precipitated on the substrate and form a smooth film, it has hitherto not been possible to produce a continuous chromium oxide layer in the calcination of the film. On the contrary, in the calcination stage, shrinkage processes occurring during the conversion of hydroxide into the oxide produce cracked grainy coatings. These considerably worsen the luster properties of the preparations. Moreover, interference effects cannot occur in the cracked and coarse-grained chromium oxide layer. As a result, the coloring chromium oxide layer on the base pigment platelets has an effect which, if anything, is more detrimental than beneficial.

It has hitherto been impossible to apply chromium oxide to nacreous pigments in the amount necessary for a deep green coloration, in a continuous film, and in the necessary fineness, in order to obtain highly lustrous pigments having the desired interference effects.

SUMMARY OF THE INVENTION

Accordingly, it is an object of the invention to provide a process, by means of which nacreous pigments can be coated in an adequate thickness with a chromium oxide layer without impairing the desired luster and interference effects, and which overcomes or significantly ameliorates the foregoing disadvantages.

Upon further study of the specification and appended claims, further objects and advantages of this invention will become apparent to those skilled in the art.

The objects have been achieved by the present invention. It has been found that, surprisingly, a chromium hydroxide layer which, before calcination, has been loaded with phosphate ions densifies on calcination and forms an even, transparent coating. The resultant nacreous pigments have a green powder color and very good lustrous (pearlescent) properties. Surprisingly, this effect is even obtained when using relatively low amounts of phosphate.

The present invention therefore relates to nacreous pigments based on mica platelets which are coated with metal oxide and carry a top layer of chromium(III) oxide, wherein the chromium oxide layer contains at least 0.05 mol% of phosphate, based on the number of moles of chromium in the layer.

The present invention also relates to a process for preparing nacreous pigments having a green powder color by coating mica pigments which are coated with metal oxides with an additional chromium(III) hydroxide top layer and calcining the pigment thus obtained, which process is characterized by the fact that, after being coated with chromium(III) hydroxide, the pigment is treated with an aqueous solution which contains at least 0.05 mol of phosphate ions per 1 mol of chromium (III) in the layer.

The invention also relates to the use of these nacreous pigments in cosmetics.

DETAILED DISCUSSION

An advantage of the pigments according to this invention is that it is now possible to apply chromium oxide layers of virtually any thickness without an attendant significant reduction in luster. On the contrary, in accordance with this invention, the chromium oxide layer, owing to its smooth uniform structure and the small particle size and according to its thickness, essentially contributes to the formation of the interference color. The optical laws governing interference phenomena in thin films are applicable and the inherent color of the chromium oxide acts like an additional filter.

The nacreous pigments according to this invention, through the inherent color of the chromium oxide layer, have a green powder color, while the interference color is due to the total thickness of the metal oxide layer and of the chromium oxide layer. Choice of the base pigment and of the thickness of the chromium oxide layer can therefore be used to control, in an optional manner, not only the interference color desired but also the saturation of the green powder color.

The base pigment used can in principle be any mica pigment which is coated with metal oxides. However, mica pigments coated with titanium dioxide are preferably used. The mica flake pigments used as base pigments are as a rule mica flakes having a diameter of about 5 to 200 $\mu$m and a thickness of about 0.1 to 5 $\mu$m and which are coated with a metal oxide layer. Because of their advantageous refractive index, the metal oxide coatings used are usually titanium dioxide or titanium dioxide hydrates and/or zirconium dioxide or zirconium dioxide hydrates. However, other colorless or, if desired, also colored metal oxides, such as, for example $SnO_2$, $Al_2O_3$ or $Fe_2O_3$, can also be used together with or as alternatives to these metal oxides.

An example of a pigment which is used particularly frequently as a mica flake pigment in which mica flakes having a diameter of about 5 to 50 $\mu$m and a thickness of about 0.5 $\mu$m are evenly coated with an optionally hydrated titanium dioxide layer, the mica surface carrying a $TiO_2$ layer of about 50 to 500 mg of $TiO_2/m^2$.

These nacreous pigments, depending on the thickness of the metal oxide layer precipitated onto them, have various interference colors. As a rule they are products which are calcined at elevated temperatures of about 600° to 1,000° C. All these pigments are known and have been described, for example in German Patent Specification Nos. 1,467,468, 1,959,998 and 2,009,566 and German Offenlegungsschriften Nos. 2,060,850, 2,106,613, 2,214,545, 2,215,191, 2,244,298, 2,313,331, 2,313,332, 2,429,762, 2,522,572, 2,522,573 and 2,628,353. The disclosures of the corresponding U.S. patents: U.S. Pat. Nos. 3,087,828 and 3,087,829, 3,711,308, 3,553,001, 3,634,119, 3,650,790, 3,832,208, 3,874,890, 3,926,659, 3,951,679, 4,084,983, 4,086,100, 4,040,859 and 4,128,435, are incorporated by reference herein.

Coating the base pigments with chromium oxide shifts the interference color of the base pigments into regions which correspond to a greater optical film thickness. This produces, expecially when using base pigments having a blue, green or silvery lustrous color, particularly attractive mixed colors. However, base pigments having a yellow or reddish interference color are in principle also suitable for being coated by the process according to the invention and give preparations which can be used for particular cosmetic purposes.

The base pigments are coated with chromium hydroxide by methods which are in themselves known. Since stable aqueous solutions of chromium(III) salts are strongly acidic, it is possible to proceed either by gradually neutralizing the suspension of the base pigment in a strongly acid chromium(III) salt solution, during which step the chromium hydroxide formed precipitates into the pigment flakes, or by allowing a chromium(III) salt solution and a base simultaneously to flow into the aqueous suspension of the base pigment, so that a pH suitable for the precipitation of chromium hydroxide is maintained in the suspension.

The pH in the precipitation step should be above 3, a pH of between 4.5 and 9 being preferable. To set the pH, any base can in principle be used. The following are mentioned by way of example: ammonia (in solution or as a gas), sodium hydroxide solution or potassium hydroxide solution. Ammonia solution is preferably used.

To carry out the precipitation, any solution containing chromium(III) ions can in principle be used. Hydrolyzable chromium(III) complex ions, such as, for example, the ammine complex, are also understood to be included in this definition. Chromium chloride or chromium alum solutions are preferably used.

However, the solution containing chromium(III) ions can also be produced in situ in the suspension of the base pigment, e.g., by reducing a solution containing chromium-(VI) ions with a suitable reducing agent, such as, for example, hydrazine. For this reduction, it is possible either to meter, for example, solutions of potassium dichromate and hydrazine sulfate simultaneously into the suspension at such a rate that there is always a slight excess of the reducing agent present in the reaction vessel or initially to introduce chromate or hydrazine sulfate, in the suspension and meter in the other component.

Regardless of how the precipitation is carried out, the rate of precipitation should be adjusted in such a way that, at any time of the coating process, only as much chromium hydroxide is produced as can be attached to the pigment surface without additional nuclei being formed in the solution. The thickness of the chromium-containing layer can be conventionally and readily controlled by control of the amount of chromium in the solution and the time of deposition, perhaps in view of a few routine preliminary tests.

The precipitation of chromium hydroxide can in principle be carried out at any temperature between the freezing point and the boiling point of the suspension. However, it has been found that secondary precipitation can occur at relatively low temperatures. It is therefore preferable to operate at an elevated temperature, for example about 50° to 100° C., in particular about 60° to 90° C. However, qualitatively good precipitations are as a rule obtained even at other temperatures.

After the desired amount of chromium hydroxide has been precipitated, the suspension is stirred for about another half hour, preferably also at an elevated temperature of about 70° C., and a solution containing phosphate ion is then allowed to flow in gradually. To complete the reaction involving the chromium hydroxide layer, the batch should then be stirred for a further period, for example about a half to one hour, at an elevated temperature, e.g. 60°–90° C. Conditions for the phosphate addition and incorporation are not critical and are routinely determined in accordance with conventional considerations, e.g., with respect to what is necessary for solubilization of the phosphate in aqueous solution.

Suitable providers of phosphate ions are not only orthophosphoric acid but also its primary, secondary and tertiary salts as well as polymeric phosphates. The prerequisite is merely that they must be sufficiently soluble to be able to be introduced in an aqueous solution into the suspension of the base pigment coated with chromium hydroxide. Suitable examples, in addition to phosphoric acid, are $KH_2PO_4$, $Na_2HPO_4.12H_2O$, $Na_3PO_4.12H_2O$, $Na_4P_2O_7.7H_2O$ and $(NaPO_3)x$. Virtually identical results are obtained independently of the type of the material containing the phosphate ions.

What quantity of phosphate ions is added depends on the amount of chromium hydroxide precipitated. However, it has been found that even a very small amount of phosphate is suitable for effecting the desired improvement in the luster properties of the pigments. A very marked improvement is thus obtained even at an amount of 0.1% of phosphate, relative to the stoichiometric amount necessary for the formation of $CrPO_4$. The full effect is already obtained at about 0.5% of phosphate. A further increase in the amount of phosphate cannot further improve the luster properties of the pigments, but, on the other hand, no adverse effect of a higher phosphate quantity manifests itself. It is thus possible without problems to add amounts of up to 100% of the stoichiometric amount and even far above that level, without the luster properties of the preparations being adversely affected. At very high amounts of phosphate, it is of course impossible for the entire amount of phosphate to be absorbed in the coating. In any case, the layer should contain at least 0.05% of phosphate, preferably at least 0.01%.

After the base pigments have been coated with chromium hydroxide and after-treated according to this invention with phosphate ions, the pigments are isolated in a customary manner. For this purpose, they are as a rule filtered off, washed, dried and calcined. During calcination, which takes place at temperatures of about 600° to 1,000° C., preferably at about 700° to 900° C., the chromium hydroxide layer is dehydrated and converted into $Cr_2O_2$.

In this calcination, which is usually carried out for about one half to one hour, it has been found that the pigments according to this invention have a crack-free layer having very good luster properties. The advantages of the process and product according to this invention manifest themselves in particular in the case of those pigments which carry relatively thick chromium oxide layers. For these, the danger of crack formation is particularly great, and in known processes, they virtually cannot be prepared so as to have satisfactory luster properties. The process according to this invention thus for the first time makes it possible to prepare even pigments which are coated with chromium oxide and have good luster properties which can contain, for example, up to 60 wt. % or more of $Cr_2O_3$, based on the total weight of the pigment. The pigments according to this invention should in any case have a content of at least 5% by weight of $Cr_2O_3$. Such a content is sufficient to ensure a desirable green powder color due to the inherent color of the $Cr_2O_3$.

The pigments according to this invention can be used in the same way as existing pigments, namely, for example, as additives to plastics, inks or paints, but in particular also in the cosmetics industry. In these applications, the new nacreous pigments are as a rule added in amounts of 0.1 to 80% by weight. Examples of customary forms of formulation are powders, creams and grease pencils, for example eye shadow pencils, eye shadow powder compacts, liquid formulations for eye shadow and lid line, make-up in pencil form, make-up powder compacts, make-up emulsion, make-up fatty gels, UV-screening emulsions, tanning emulsions, foam bath concentrates having a color luster, skin care lotions etc. The nacreous pigments according to this invention are distinguished in these uses by their deep green powder color and their excellent luster properties.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

The examples which follow describe the preparation of some nacreous pigments according to this invention. Instead of the base pigments used in these examples, other base pigments can also be coated equally successfully, and, likewise, other variations of the process conditions and corresponding to the preceding descriptive section are also possible.

EXAMPLE 1

A solution of 175 g of $KCr(SO_4)_2 \times 12H_2O$ in 0.6 liter of water is allowed to flow slowly, in the course of 2 hours, at 70° C., into a solution of 100 g of $TiO_2$/mica pigment having a blue interference color (platelet size 10 to 60 um, 50% of mica, 50% of $TiO_2$) in 2 liters of water. The pH of the suspension is maintained at a constant value of about 6 by simultaneously metering in a 5% $NH_3$ solution. After the suspension has been stirred for about half an hour, a solution of 5 g of $Na_2HPO_4 \times 12H_2O$ in 100 ml of water is added in the course of 15 minutes, and stirring is continued for about 1 hour at 70° C. The suspension is then filtered, and the solids filtered off are washed with water, dried at about 120° C. and calcined for 30 minutes at 840° C.

To assess the lustrous properties, the pigment is incorporated as an approximately 2% strength suspension in a nitrocellulose/acrylic resin lacquer. This is then coated onto a card in the form of a film which is 500 μm thick when wet and which is assessed after drying. This assessment shows the pigment prepared according to the example to have a deep green interference color and a lively green luster.

A pigment which has been prepared in the same way but not treated with phosphate has a reduced lustre and the chromium oxide coating hardly contributes to the formation of the interference color.

EXAMPLES 2 a TO g

A solution of 17.5 kg of $KCr(SO_4)_2.2H_2O$ in 80 liters of water is slowly (feed rate 20 l/h) added at 75° C. to a suspension of 10 kg of $TiO_2$/mica pigment having a blue interference color (platelet size 10 to 60 μm, 49% of mica, 51% of $TiO_2$) in 200 liters of water. During the addition, a pH of about 6 is maintained by simultaneously metering in a 5% $NH_3$ solution. During the coating process with chromium hydroxide, aliquots of the suspension are removed at various times and worked up separately but in the same way, by adding to the sample 0.5 g of $Na_2HPO_4 \times 12H_2O$ per g of base pigment in the sample, filtering the mixture after stirring for half an hour and washing, drying and igniting the solids filtered off at 880° C. This produces the following pigments:

| Sample No. | Chromium oxide coating (g of $Cr_2O_3$ per g of base pigment) |
|---|---|
| 2 a | 0.168 |
| 2 b | 0.192 |
| 2 c | 0.222 |
| 2 d | 0.231 |
| 2 e | 0.242 |
| 2 f | 0.247 |
| 2 g | 0.266 |

The assessment of the pigments obtained, using the method described in Example 1, shows that all pigments have a good luster and a high tinctorial strength and that with increasing amounts of chromium oxide the interference color is shifted towards yellow, as expected from the development of optically thicker films.

EXAMPLES 3 a TO i

Pigments are prepared in correspondence with Example 1, but, in deviation from Example 1, different amounts of $Na_2HPO_4 \times 12H_2O$ are used for the aftertreatment. The following table indicates the amount of phosphate used for the individual pigments as a percentage of the amount necessary for the stoichiometric conversion to $CrPO_4$.

| Sample No. | Amount of phosphate |
|---|---|
| 3 a | 0 |
| 3 b | 0.01% |
| 3 c | 0.1% |
| 3 d | 0.5% |
| 3 e | 1.0% |
| 3 f | 2.0% |
| 3 g | 4.0% |
| 3 h | 10.0% |
| 3 i | 100.0% |

Assessment of the pigments in line with the method indicated in Example 2 shows that the presence of only 0.1% of phosphate has a beneficial influence on the luster and the color of the pigment and that with 0.5% of phosphate, the green shade desired and good gloss are obtained and that larger amounts of phosphate do not provide any further improvement.

EXAMPLES 4 a TO e

Pigments are prepared in correspondence with Example 1, but, in deviation from Example 1, the substances containing phosphate ions and listed in the following table are used for the after-treatment with phosphate in each case in an amount which corresponds to 66% of the stoichiometric amount.

| Sample | Phosphate source |
|--------|------------------|
| 4 a    | $H_3PO_4$        |
| 4 b    | $KH_2PO_4$       |
| 4 c    | $Na_3PO_4.12 H_2O$ |
| 4 d    | $Na(PO_3)x$      |
| 4 e    | $Na_4P_2O_7.10 H_2O$ |

Assessment of the pigments in line with the method indicated in Example 1 shows that, independently of the type of phosphate source used, the pigments have a good luster and a deep color.

The preceding examples can be repeated with similar success by substituting the generically of specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a green nacreous pigment comprising a mica platelet coated with a first layer of a metal oxide and a second layer of chromium(III) oxide, wherein the chromium content, calculated as $Cr_2O_3$, is at least 5% by weight based on the total weight of the pigment, the improvement wherein the chromium oxide layer further contains at least 0.05 mol % of phosphate ion based on the number of moles of chromium(III) ion therein.

2. A nacreous pigment of claim 1 wherein the phosphate content of the chromium oxide layer is at least 0.1 mol %.

3. A nacreous pigment of claim 1 or 2, wherein the first layer of metal oxide is a titanium dioxide layer.

4. A nacreous pigment of claim 1 or 2 wherein the mica platelet is of a diameter of about 5–200 μm and a thickness of about 0.1 to 5 μm, and the metal oxide layer is a titanium dioxide layer of a weight of 50–500 mg/m².

5. A process for preparing nacreous pigments of claim 1 having a green powder color by coating mica pigments which are coated with metal oxides with an additional chromium(III) hydroxide top layer and calcining the pigment thus obtained, further comprising, after the coating with chromium(III) hydroxide, and before calcination treating the pigment with an aqueous solution which contains at least 0.05 mol of phosphate ions per 1 mol of chromium(III) in the layer.

6. A process of claim 5, wherein the solution contains at least 0.1 mol of phosphate per mol of chromium(III).

7. A process of claim 5 comprising adding to the aqueous suspension of the pigment which is coated with chromium(III) hydroxide, a corresponding amount of phosphate ions and then stirring the suspension for about 0.5 to 2 hours at an elevated temperature.

8. A lustrous composition comprising a base composition in which it is desired to achieve a lustrous effect and an amount of a nacreous pigment of claim 1 effective to achieve a lustrous effect.

9. A lustrous composition of claim 8 wherein the base composition is a cosmetic formulation.

* * * * *